Feb. 27, 1968   N. HUFFNAGLE   3,370,862
SKI SLED
Filed Dec. 13, 1965   3 Sheets-Sheet 1
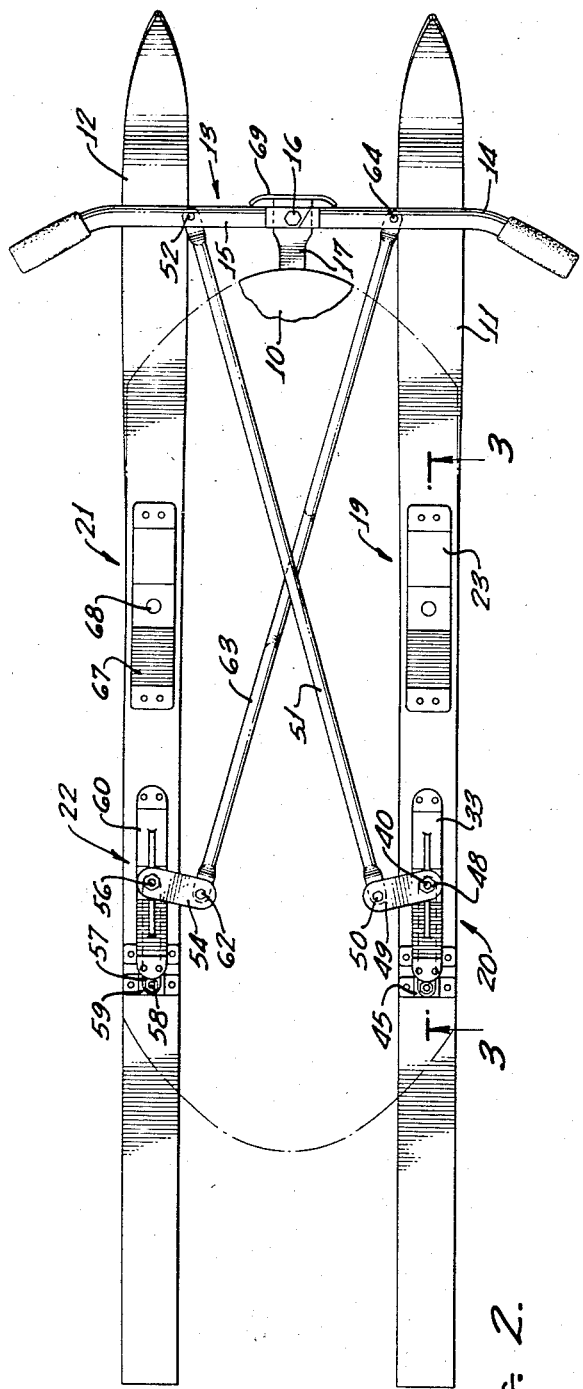
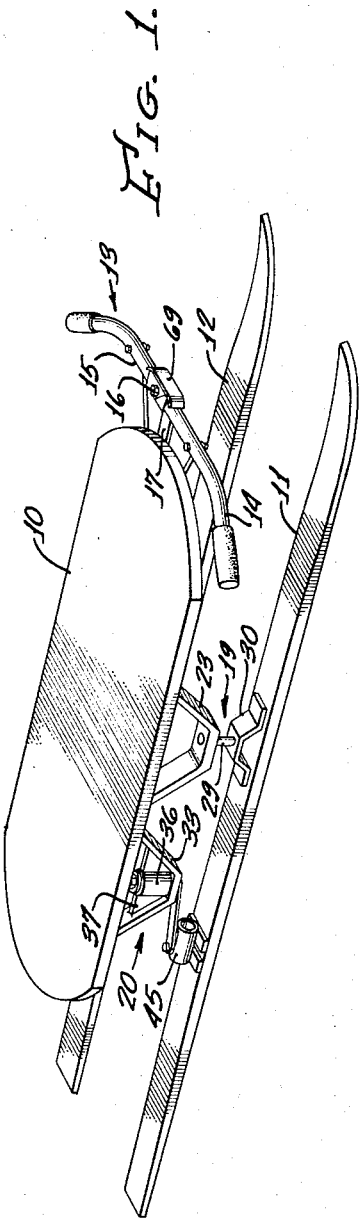
INVENTOR.
NORMAN HUFFNAGLE
BY
ATTORNEYS.

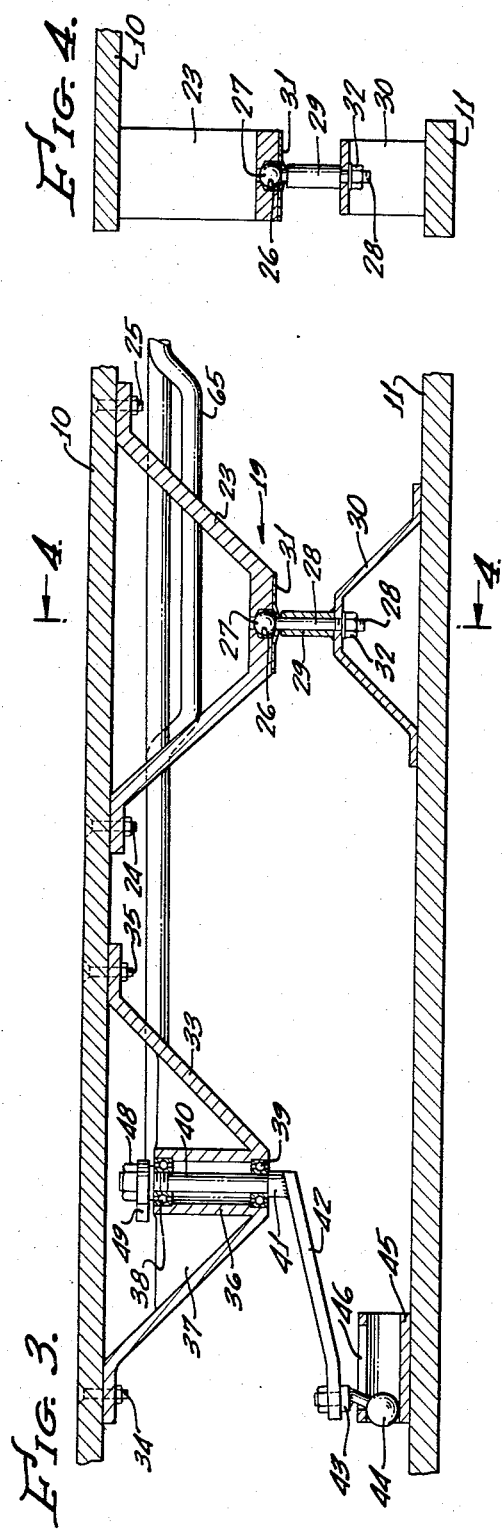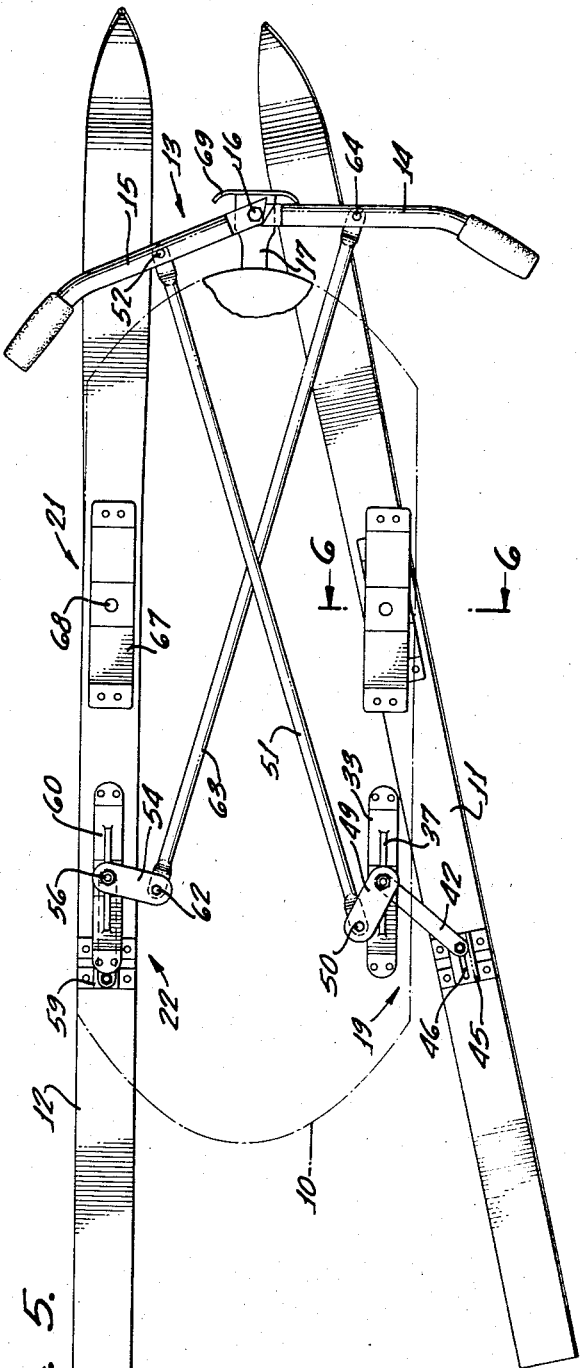

Feb. 27, 1968  N. HUFFNAGLE  3,370,862
SKI SLED
Filed Dec. 13, 1965  3 Sheets-Sheet 3
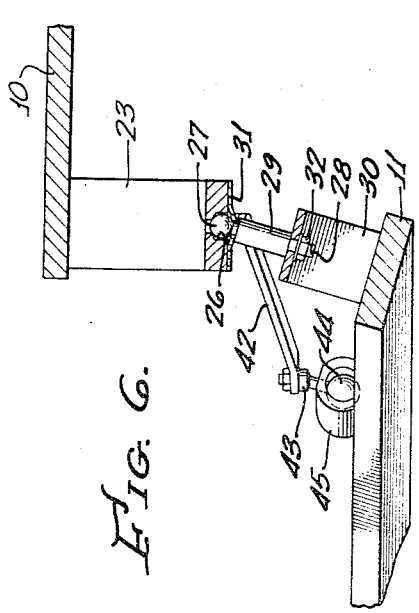
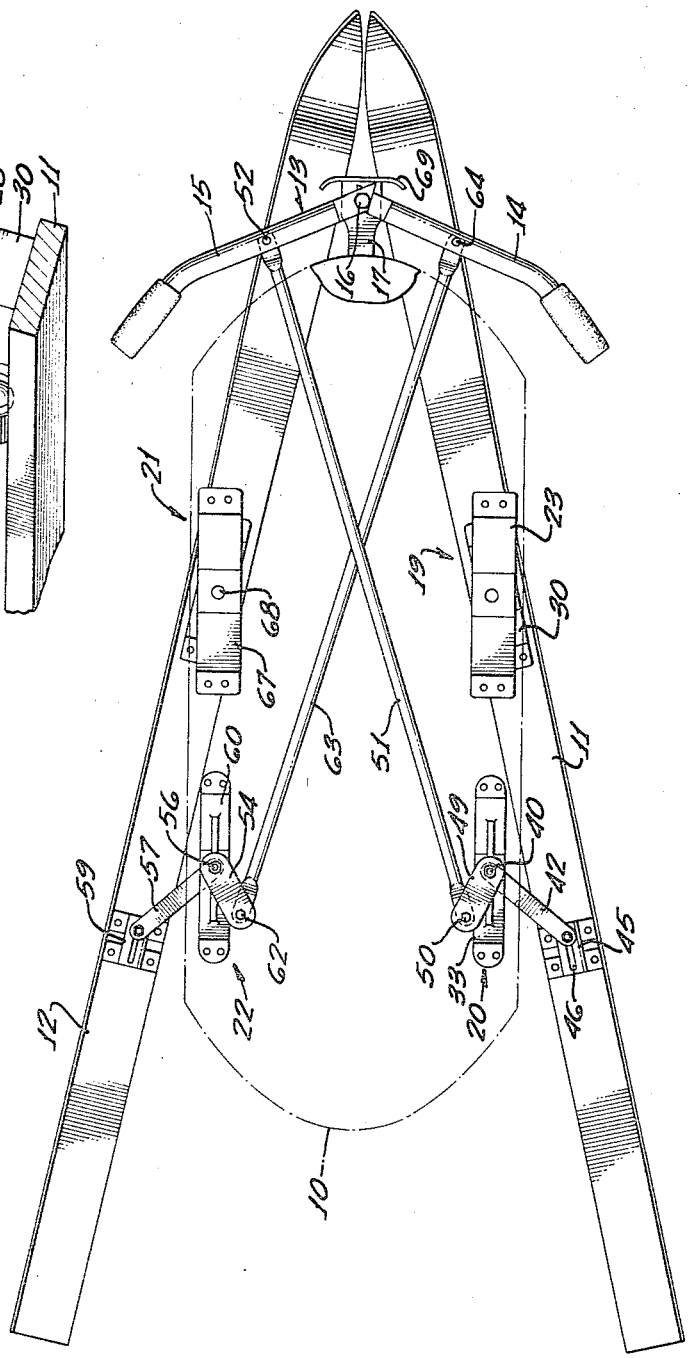
INVENTOR.
NORMAN HUFFNAGLE
BY
ATTORNEYS.

United States Patent Office 3,370,862
Patented Feb. 27, 1968

3,370,862
SKI SLED
Norman Huffnagle, 10282 Overhill Drive,
Santa Ana, Calif. 92705
Filed Dec. 13, 1965, Ser. No. 513,202
10 Claims. (Cl. 280—21)

ABSTRACT OF THE DISCLOSURE

A sled having a platform, a duality of skis and a means connecting the platform to the skis, the connecting means including an arrangement for causing the skis to rotate about their longitudinal axes when they are pivoted in a horizontal plane by the exertion of a force at the rearward portions of the skis through a steering mechanism.

This invention pertains to a sled having provisions for steering and braking.

The sled of this invention is usable on snow generally in the manner of a conventional sled. It utilizes skis instead of runners, however, which give it an advantage especially in loose snow which is penetrated by steel runners and impedes the progress of the sled. With the substitution of water skis, the sled can be used in the water as well as in snow. One of the major advantages of the sleeve is in its ability to be turned in either direction and to be braked to a stop. This is all accomplished by manipulating the handles, which can turn either the left or the right ski individually, or can move both simultaneously for braking. The steering mechanism causes the pivoted ski to tilt so that it digs in and makes the steering or braking a great deal more effective.

In general, the sled of this invention includes a platform to lie upon, supported below by two skis. Each ski has two connections to the platform, the rearward one of which is movable outwardly through a crank mechanism upon turning of the handle at the opposite side of the sled. The ski pivots about its front support, where a ball joint is provided at a location higher than the connection to the ski at the rear. As a result, the ski tilts relative to a longitudinal axis as it is being pivoted by the steering mechanism. By pulling downwardly on both sides of the steering handle, the skis converge at their forward ends, simultaneously pivoting outwardly and tilting so that they dig in and cause the sled to come to a stop.

An object of this invention is to provide an improved steerable sled.

Another object of this invention is to provide a sled that can be selectively steered and braked.

A further object of this invention is to provide a sled supported by skis with provision for tilting the skis during steering or braking to increase their effectiveness.

An additional object of this invention is to provide a sled in which a single set of handles provided for both steering and braking.

These and other objects will become apparent from the following detailed description taken in connection with the accompanying drawing in which:

FIGURE 1 is a perspective view of the sled of this invention;

FIGURE 2 is a top plan view of the sled with the upper platform removed for clarity;

FIGURE 3 is an enlarged fragmentary longitudinal sectional view taken along line 3—3 of FIGURE 2;

FIGURE 4 is a transverse sectional view taken along line 4—4 of FIGURE 3;

FIGURE 5 is a view similar to FIGURE 1, but with the right-hand ski rotated for effecting a left turn;

FIGURE 6 is a sectional view taken along line 6—6 showing the tilting of the ski during the rotation of the ski for turning; and FIGURE 7 is a view similar to FIGURE 1, but with both skis turned for accomplishing a braking action.

As shown in the drawing, particularly in FIGURE 1, the sled of this invention includes a horizontal platform 10, which is supported by a pair of skis 11 and 12. Steering of the sled is accomplished through the handle bar 13 at the forward end of the platform 10. The handle bar 13 is in two sections 14 and 15 pivotally connected to the platform by pin 16 carried by a bracket 17 extending from the forward end of the platform.

The right-hand ski 11 connects to the undersurface of the platform 10 through front and rear support assemblies 19 and 20, respectively. Similar support assemblies 21 and 22 are provided for the left-handed ski 12. The front support assembly 19 for the right-hand ski 11 may be seen in detail in FIGURES 3 and 4. It includes a generally V-shaped bracket 23 connected at its outer ends to the undersurface of the platform 10 by bolts 24 and 25. At the bottom of the bracket 23 is a recess 26 that receives a ball 27 at the upper end of a pin 28. The latter element extends vertically downwardly from the ball 27 through a sleeve 29 that projects above a bracket 30 generally similar to but smaller than the bracket 23. A plate 31 on the bottom of the bracket 23 retains the ball 27 in its socket, so that a ball-and-socket joint results. The lower end of the pin 28 is threaded so that a nut 32 connects it to the upper portion of the lower bracket 30. The bottom ends of the lower bracket 30 connect to the upper surface of the ski 11. As a result of this construction, it can be seen that the ski 11 can pivot in any direction about the ball 27.

The rear support 20 for the ski 11 includes a bracket 33 connected at its upper ends by bolts 34 and 35 to the undersurface of the platform 10. A sleeve 36 extends upwardly from the bottom end of the bracket 33, being reinforced by a web 37. Bearings 38 and 39 are located at the upper and lower ends of the sleeve 36, respectively. A shaft 40 extends through the tube 36 at its axis, and is received by the inner races of the bearings 38 and 39. The shaft 40 in this manner is rotationally supported with its axis vertical. The enlarged portion 41 of the shaft 40 beneath the bottom bearing 39 connects to an arm 42 that inclines rearwardly and downwardly to its bottom end, where it connects to a post 43. The latter element is provided with a ball 44 at its bottom end that fits within a cylindrical sleeve 45 attached to the upper surface of the ski 11. The axis of the sleeve 45 is parallel to the longitudinal axis of the ski, and also to a slot 46 in the sleeve through which the post 43 passes. By this arrangement, rotation of the shaft 40 causes the arm 42 to rotate with it, which, through the ball 44 in the sleeve 45, moves the rearward portion of the ski 11.

The upper end of the shaft 40 is threaded, so that, by means of a nut 48, it is connected to a horizontal arm 49 (see FIGURE 2). The other end of the arm 49 is pivotally joined by a pin 50 to a rod 51 that extends to the left-hand portion 15 of the handle bar 13. The rod and handle bar portion 15 are connected by a pivot pin 52.

The rear support assembly 22 for the left-hand ski 12 is identical to that for the right, including an arm 54 connected to a vertical shift 56 that extends downwardly through a sleeve comparable to the sleeve 36 of the support assembly 20. At the bottom end of the shaft 56 is an arm 57 that corresponds to the arm 42 and which, through a post 58, connects to a ball element received in a cylindrical sleeve 59 that is secured to the upper surface of the ski 12. A bracket 60 is used to connect the support assembly 22 to the undersurface of the platform 10.

The outer end of the arm 54 connects, by a pivot pin 62, to a rod 63 that extends to the right-hand portion 14 of the handle bar 13, connecting to the handle bar by a pivot pin 64. The intermediate portion 65 of the rod 63 is offset, as seen in FIGURE 3, so that the rod 63 can clear the rod 51. The front support 21 is identical to the support 19 for the ski 11, including an upper generally V-shaped bracket 67 for connection to the platform 10. At the lower central portion of the bracket 67 is the ball-and-socket joint 68 that permits the universal pivotal movement of the forward end of the ski 12.

By this arrangement, steering of the sled is accomplished by pulling downwardly on the left-hand or right-hand portion of the handle assembly 13, depending upon the direction of the turn. For example, as seen in FIGURE 5, the left handle portion 15 is pivoted about the pin 16 to rotate the right-hand ski 11 and accomplish a left turn. This movement of the handle portion 15 causes the rod 51 to push on the arm 49 so as to rotate it counterclockwise as viewed from above. This, in turn, rotates the vertical shaft 40 in the bearings 38 and 39, causing the lower arm 42 to turn with the upper arm 49. Acting together in this manner, the arms 49 and 42, together with the shaft 40, form a bell crank. As a result of the rotation of the arm 42, the rearward portion of the ski 11 is moved outwardly away from the longitudinal axis of the sled. This movement is permitted because the post 43 can slide forwardly in the slot 46 as the rearward portion of the ski is pushed outwardly. As the rearward portion of the ski 11 is moved in this manner, the forward part pivots about the ball-and-socket joint 27 in a plane substantially parallel to the platform 10, with the forward end of the ski being pointed inwardly and the rearward end inclined outwardly. Hence, the ski is positioned to effect a turning of the sled.

In adidtion to this movement of the ski, it is tilted as the steering takes place. The steering force is applied to the rearward portion of the ski where the ball 44 fits within the sleeve 45. This is lower than the ball-and-socket joint 27 where the forward portion of the ski attaches to the platform. Consequently, a movement is created as the force at the rear portion tends to lift the outside edge of the ski. This causes the ski 11 to tilt as it is rotated about its longitudinal axis. This movement is made possible by the ball-and-socket joint at the forward end located above the connection of the crank arm at the rearward portion of the ski. Therefore, the ski not only is moved to position its forward end inwardly, but it is also tilted with its inner edge dropped downwardly and the outer edge raised. Therefore, the ski is slanted so that it will dig into the snow and accomplish the turn much more rapidly.

Once the turn has been completed, the handle portion 15 is returned to its original position, which is that of FIGURE 2. The return movement of the handle portion 15 is limited by engagement with the stop 69 at the forward end of the bracket 17. This stop limits the movement of the handle portion 15, so that it will automatically position the ski 11 to point straight forward, parallel to the longitudinal axis of the sled.

Of course, the steering for the other ski 12 is the same as for the ski 11. The handle portion 14 at the right-hand side is pulled downwardly to cause a push on the rod 63 to rotate the crank arm 54 and force the rearward portion of the ski 12 outwardly. The result is that the ski 12 pivots about the ball-and-socket joint 68, causing the ski 12 to nose in at the front and simultaneously pivot relative to its longitudinal axis. Again, therefore, the combined rotation and tilting of the ski causes an effective turning action. Return movement of the ski 12 is limited by the stop 69 so that the handle section 14 positions the ski 12 in alignment with the longitudinal axis of the sled.

The sled is braked by moving both handles downwardly, as indicated in FIGURE 7. The rods 51 and 63 then cause the skis 11 and 12, respectively, to pivot so that their forward ends are made convergent toward the axis of the sled. At the same time, of course, the rearward ends are spread apart, and both skis are tilted so that their adjacent inner edges are lowered and their outer edges are raised. As a result, there is a resistance to movement of the sled, and it will be brought to a stop.

The sled of this invention, therefore, is more versatile than prior designs, being both steerable and capable of being braked to a stop. The entire action is controlled by the handle bar, so that there is no necessity for attempting to manipulate a separate braking element. Steering and braking, therefore, are accomplished quite easily, while at the same time the rotation and tilting of the skis causes the skis to be particularly effective in this action.

The foregoing detailed description is to be clearly understood as given by way of illustration and example only, the spirit and scope of this invention being limited solely by the appended claims.

I claim:
1. A sled comprising
a platform,
a duality of skis beneath said platform one at either side thereof,
forward support means for connecting forward portions of skis to said platform, and
rear support means for connecting rearward portions of said skis to said platform,
   said forward support means including means for permitting pivotal movement of said skis relative to said platform,
   said rear support means including means for selectively moving rearward portions of said skis outwardly relative to the longitudinal axis of said platform for pivotal movement of said in a plane substantially parallel to said platform,
      said last-mentioned means being connected to said skis below said pivotal connection at said forward portions of said skis for effecting pivotal movement about an axis longitudinally of said skis simultaneously with said pivotal movement in said plane substantially parallel to said platform.

2. A device as recited in claim 1 in which said means for moving said rearward portions of said skis outwardly includes
a manually movable member for each of said skis at the forward portion of said platform,
and means connecting each of said manually movable members to the ski on the opposite side of the platform therefrom.

3. A device as recited in claim 1 in which said means for selectively moving said rearward portions of said skis outwardly includes for each ski
a crank carried by said rear support means thereof,
   each crank being pivotal outwardly relative to the longitudinal axis of said platform about a substantially vertical axis,
and means interconnecting the outer end of each of said cranks and the adjacent ski with freedom for combined pivotal movement and sliding movement longitudinally of said ski.

4. A sled comprising
a platform,
a duality of skis beneath said platform one at either side thereof,
a front support for each of said skis,
   each of said front supports including a universal joint means interconnecting said platform and the ski thereof,
a rear support for each of said skis,
   each of said rear supports including a crank arm,
   and means pivotally connecting outer end portions of each of said crank arms to the corresponding ski thereof at a location vertically below said universal joint means of such ski, and means for selectively rotating said crank arms for moving the rearward portions of said skis outwardly relative to said platform for causing said skis to pivot about said universal joint means to incline inwardly at their forward ends and to cause said skis simultaneously to tilt relative to their axes.

5. A device as recited in claim 4 in which said means for selectively rotating said crank arms includes a duality of movable handles disposed one on each side of said platform forwardly of said rear supports, and means connecting each handle with the crank arm on the opposite side of said platform therefrom.

6. A device as recited in claim 4 in which said means for connecting said crank arms to said skis includes for each of said arms a depending post at the outer end portion of said crank arm, and a slotted member carried by the adjacent ski, said post engaging said member at said slot thereof whereby said slot permits said member to slide relative to said post so the crank arm with which said post is associated is rotated.

7. A sled comprising a platform, a duality of skis beneath said platform one at either side thereof, a front support for each of said skis, each of said front supports including a ball-and-socket joint for permitting said skis to rotate relative to the longitudinal axis of said platform and to tilt relative to the longitudinal axes of said skis, a rear support for each of said skis, a bell crank for each of said rear supports, means for mounting each of said bell cranks for rotation about a substantially vertical axis, means connecting one end of each of said bell cranks to the rearward portion of the ski therefor with freedom for pivotal and sliding movement relative to said ski, and means for selectively rotating the other ends of said bell cranks for causing said one end to pivot said ski about said ball-and-socket joint, said connecting means being below said ball-and-socket joint.

8. A device as recited in claim 7 in which said means for rotating said bell cranks includes a handle bar at the forward end of said platform, said handle bar including independently movable portions on either side of said platform, and a duality of rod means, one rod means interconnecting said handle bar portion on one side of said platform and said other end of the bell crank on the opposite side of said platform, the other rod means interconnecting said handle bar portion on said opposite side of said platform with said other end of the bell crank on said one side of said platform.

9. A device as recited in claim 7 in which said means for connecting one end of each of said bell cranks to the rearward portion of the ski therefor includes a sleeve secured to the upper surface of said ski with its axis parallel to the longitudinal axis of said ski, said sleeve having a longitudinal slot therein, a post carried by said one end of said bell crank and extending through said slot, and an enlargement on the end of said post in said sleeve.

10. A sled comprising a platform, a duality of skis beneath said platform one at either side thereof, and support means for said skis, said support means including forward support means for connecting forward portions of said skis to said platform, and rear support means for connecting rearward portions of said skis to said platform, said forward support means including means for permitting pivotal movement of said skis relative to said platform, said rear support means including means for selectively moving rearward portions of said skis outwardly relative to the longitudinal axis of said platform for pivotal movement of said skis in a plane substantially parallel to said platform, said support means including means for causing said skis to pivot about an axis longitudinally of said skis simultaneously with said pivotal movement in said plane substantially parallel to said platform.

References Cited

FOREIGN PATENTS 217,307  2/1961  Austria.
782,190  5/1935  France.

LEO FRIAGLIA, *Primary Examiner.*

BENJAMIN HERSH, *Examiner.*

L. D. MORRIS, *Assistant Examiner.*